United States Patent
Szita

(10) Patent No.: US 6,608,731 B2
(45) Date of Patent: Aug. 19, 2003

(54) DYNAMIC REDUCTION OF TRACK SHAPE ERRORS IN DISC DRIVES

(75) Inventor: Gabor Szita, Santa Clara, CA (US)

(73) Assignee: Seagate Technology LLC, Scotts Valley, CA (US)

(*) Notice: Subject to any disclaimer, the term of this patent is extended or adjusted under 35 U.S.C. 154(b) by 231 days.

(21) Appl. No.: 09/755,256

(22) Filed: Jan. 5, 2001

(65) Prior Publication Data

US 2001/0038507 A1 Nov. 8, 2001

Related U.S. Application Data

(60) Provisional application No. 60/174,456, filed on Jan. 5, 2000.

(51) Int. Cl.[7] ............................ G11B 21/02; G11B 5/596
(52) U.S. Cl. ........................ 360/75; 360/77.11; 360/77.02
(58) Field of Search ................................. 360/75, 77.02, 360/77.07, 77.08, 77.11, 27, 54, 78.04

(56) References Cited

U.S. PATENT DOCUMENTS

| | | | |
|---|---|---|---|
| 4,414,589 A | 11/1983 | Oliver et al. | 360/75 |
| 5,541,784 A | 7/1996 | Cribbs et al. | 360/75 |
| 5,659,436 A | 8/1997 | Yarmchuk et al. | 360/31 X |
| 6,101,058 A | 8/2000 | Morris | 360/69 |
| 6,392,834 B1 * | 5/2002 | Ellis | 360/77.04 |
| 6,411,461 B1 * | 6/2002 | Szita | 360/77.07 |
| 6,469,859 B1 * | 10/2002 | Chainer et al. | 360/75 |

* cited by examiner

*Primary Examiner*—Andrew L. Sniezek
(74) *Attorney, Agent, or Firm*—Merchant & Gould P.C.

(57) ABSTRACT

The invention eliminates relative and absolute track shape errors by writing zero acceleration path (ZAP) correction factors into the servo sectors during track propagation. A servo track guide zone is written to the disc. ZAP correction factors are written to the guide zone and self-propagating servo writing commences. The ZAP correction factors are determined in only two disc revolutions per track. The read element follows track k, a previously written track, and the write element writes servo marks for track k+1 during a write revolution. The position signal is monitored and recorded in order to estimate the shape of track k+1 according to the inverse transformation method during a correction revolution.

19 Claims, 8 Drawing Sheets

DYNAMIC REDUCTION OF TRACK SHAPE ERRORS IN DISC DRIVES

RELATED APPLICATIONS

This application claims priority of U.S. provisional application Serial No. 60/174,456, filed Jan. 5, 2000.

FIELD OF THE INVENTION

This application relates generally to disc drive data storage devices and more particularly to an apparatus and method of writing servo track information thereon.

BACKGROUND OF THE INVENTION

Disc drives are the most common means of storing electronic information used today. Typical disc drives have one or more magnetic media discs attached to a spindle; the spindle and discs are rotated at a constant velocity by a spindle motor. An actuator assembly, attached to a bearing shaft assembly next to the discs, radially traverses over the surface of the discs. The actuator assembly has a plurality of actuator arms, each with one or more flexures extending from the end of each actuator arm. A read/write head is attached to the distal end of each flexure. The actuator assembly is rotated about the bearing shaft assembly by a servo positioner. The servo positioner receives signals from a controller, rotates the actuator assembly, and positions the read/write head relative to the disc surface.

Information is transferred to and from the discs by the read/write heads attached to the flexures at the end of the actuator arms. Each head includes an air bearing slider that enables the head to fly on a cushion of air in close proximity to the corresponding surface of the associated disc. Most heads have a write element and a read element. The write element is used to store information to the disc, whereas the read element is used to retrieve information from the disc.

Discs, to facilitate information storage and retrieval, are radially divided into concentric circles known as "servo tracks" or "tracks". Tracks are given a track number, among other identifying information, so that the servo positioner can align the read/write head over desired track. Information is stored or retrieved from the disc after the read/write head is in the correct position. The process of switching between different tracks is called "seeking", whereas remaining over a single track while information is stored or retrieved is called "following".

Each track is linearly subdivided into pie-shaped sections, called "segments" or "sectors". The two most common types of sectors are informational data sectors and servo data sectors. In a typical disc drive, the informational data sectors usually contain information generated or stored by the user such as programs files, application files, or database files. There may be ten to a hundred, or even more, informational data sectors dispersed around a single track.

The servo sectors, on the other hand, contain information that is used by the servo positioner to determine the radial, and linear, position of the head relative to the disc surface and relative to the track center. Servo sectors typically consist of a Grey code field, which provides coarse position information to the servo positioner such as the track and cylinder number, and a servo burst field, which provides fine position information to the servo positioner such as the relative position of the head to the track center. Generally speaking, the burst field creates a positive voltage on one side of the track centerline and a negative voltage on the other side of the track centerline. The read head can be aligned directly over a track centerline by positioning the read head such that the sum of the burst field voltages equal zero.

Servo sectors are usually placed between adjacent informational data sectors on the same track. A clock signal mechanism is used to insure that data intended to be stored in a servo sector does not overwrite data in an information sector (and vice versa).

During the servo writing process, a timing pulse from the clock signal mechanism notifies the servo positioner when the head is over a servo sector (as opposed to over an information sector). The write enable;signal is turned on and information is written to the servo sector. The timing pulse also notifies the servo positioner when the head is over an information sector. The write enable signal is turned off and servo information is not stored in the informational data sector during the servo writing process.

In contrast during, normal disc drive operation, the timing pulse notifies the servo positioner when the head is over an information sector (as opposed to a servo sector). The write enable signal is turned on, and data is written to the information sector. The timing pulse also notifies the servo positioner when the head is over a servo sector. The write enable signal is turned off and user data is not stored in the servo sector during normal disc drive operation.

The number of tracks located within a specific area of the disc is called the "track density". The greater the number of tracks per area, the greater the track density. The track density may vary as the disc is radially traversed. Disc manufacturers attempt to increase track density in order to place more information on a constant size disc. Track density may be increased by either decreasing the track width or by decreasing the spacing between adjacent tracks.

An increase in track density necessitates increased positioning accuracy of the read/write elements in order to prevent data from being read from or written to the wrong track. Manufacturers attempt to fly the read/write head elements directly over the center of the desired track when the read/write operation occurs to insure that the information is being read from and written to the correct track. Hitting the track center target at high track densities requires that the tracks be as close to perfectly circular as possible when written to the disc surface.

Tracks are usually written on the disc during disc drive manufacturing using one of two means: 1) a servowriting machine, or 2) self-propagated servo writing. In both methods, a timing clock is used to determine when the head is over an area where a servo sector is to be written. A write enable signal is activated and servo information is written when the timing pulse indicates that the head is located over a servo sector. The write enable signal is de-activated and information is not written once the head exits the area where a servo sector is to be written.

A servowriting machine is a large piece of external equipment that writes servo tracks on a disc drive. The servowriting machine uses a very accurate lead screw and laser displacement measurement feedback device to precisely align a write element. The write element, which is attached to an external head/arm positioner, is aligned relative to where the desired track is to be written on the disc surface. A track is written on the disc once the write element is correctly aligned. The head/arm positioner then moves the write element a predetermined distance to the next desired track location. The head/arm positioner, therefore, controls both the track placement and track-to-track spacing.

A servowriter has several drawbacks. First, a typical disc may contain more than 60,000 servo tracks. The process of aligning and writing each track on the disc is very time consuming and expensive. Second, although very accurate at lower track densities, the servowriter cannot meet the accuracy requirements dictated by higher track densities. Finally, the servo writer must be used in a clean room because the disc components are exposed during servo writing; again adding to the expense of the servo writing process.

The second means of writing tracks on a disc is called self-propagating servo writing. Oliver et al first described this method of servo track writing in U.S. Pat. No. 4,414,589. Several other patents have disclosed slight variations in the Oliver patent, but the same basic approach is used. Under the basic method, the drive's actuator assembly is positioned at one of its travel-range-limit stops. A first reference track is written with the write head element. The first reference track is then read with the read element as the head is radially displaced from the first reference track. When a distance is reached such that the read element senses a predetermined percentage of the first reference track's amplitude, a second reference track is written. The predetermined percentage is called the "reduction number". For example, the read element senses 100% of the first reference track's amplitude when the read element is directly over the first reference track. If the reduction number is 40%, the head is radially displaced from the first reference track until the read element senses only 40% of the first reference track's amplitude. A second reference pattern is written to the disc once the 40% is sensed by the read element. The head is then displaced in the same direction until the read head senses 40% of the second reference track's amplitude. A third reference track is then written and the process continues. The process ends when the actuator arm's second travel-range-limit stop is reached and the entire disc surface is filled with reference tracks. The average track density is then calculated using the number of tracks written and the length of travel of the head.

If the average track density is too high, the disc is erased, the reduction number is lowered so that a larger displacement occurs between tracks, and the process is repeated. If the track density is too low, the disc is erased, the reduction number is increased so that a smaller displacement occurs between tracks, and the process is repeated. If the track density is within the desired range, the reduction number for the desired average track density has been determined, the disc is erased, and servo tracks are written to the disc by alternatively writing servo and reference tracks. The servo tracks are further divided by alternatively writing servo and informational sectors.

A well-known problem with self-propagating servo writing is called "radial error propagation". The servo system, when writing a new track during self-propagating servo writing, obtains position information by monitoring the signal generated in the read head by the previous track's servo information. The servo system "follows" the path of the previous track, and therefore, the track being written inherits any imperfections (caused by spindle wobble, disc slip, changing head fly height, and thermal expansion among others) in the track being followed. The imperfections of the followed track may even be amplified within the written track if the closed loop gain of the servo positioner is larger than unity at certain frequencies.

Ideally, tracks are perfectly circular and spaced at a specific distance from each other. The imperfections in track shape and track spacing are referred to as "track squeeze". Track shape imperfections are referred to as dynamic or AC track squeeze, whereas track spacing imperfections are referred to as static or DC track squeeze. AC track squeeze refers to the situation in which two adjacent tracks have shape imperfections at different locations around their individual circumferences. The two tracks may be too close together at some points and too far apart at other points. DC track squeeze, on the other hand, refers to the situation in which two adjacent tracks are either closer or farther apart than a nominal distance. In other words, the spacing between the two tracks is incorrect even though the two tracks may be perfectly circular. The term "track squeeze" is often used to generally refer to the combination of AC and DC track squeeze. Furthermore, the track-to-track variation of track shape is called the "relative track shape error", whereas the deviation of the track shape from a perfect circle is called "absolute track shape error". The prior art methods of machine servo writing and self-propagated servo writing cannot achieve the accuracy needed for higher track densities because of inherent limitations in controlling track squeeze, relative track shape error, and absolute track shape error.

Yarmchuk et al in U.S. Pat. No. 5,659,436 extensively studied radial error propagation. Yarmchuk proposed that indefinite growth of written in errors are avoided by insuring that the propagation gain is less than unity at all frequencies. Yarmchuk proposed that the gain could be maintained at a value less than unity at all frequencies by carefully choosing the open loop transfer function and/or providing an appropriate reference correction table derived from the position error signal during the write revolution of the previous track. However, the method proposed by Yarmchuk fails to discuss the influence of measurement noise and requires complicated calculations for implementation.

The Yarmchuk method contains an additional drawback. Yarrnchuk allows relatively large absolute track shape inaccuracy (i.e., the deviation of the track shape from a perfect circle). In effect, the accuracy obtained by the Yamichuk method is the track following accuracy of the disc drive, or 10%.

Zero Acceleration Path ("ZAP") correction is another approach created to eliminate radial error propagation. The basic idea of ZAP correction is to add appropriate correction factors to the measured head position at each servo sector. The correction factors cancel all written in errors, thereby improving the shape of the modified track. The correction factors are typically determined during or after the servo track writing process. The correction factors are then written back on the discs; usually each servo sector has a dedicated field for storing the correction factors.

The prior art method of determining ZAP correction factors is called "inverse transformation". Inverse transformation guarantees that track squeeze is minimized and that the tracks are circular. In other words, the inverse transformation method guarantees that the relative track shape error (the track-to track variation) remains small, and that the absolute track shape (the deviation of the tracks from a perfect circle) also remains small as the self- servo track writing propagates. The major disadvantage of using inverse transformation is that several disc revolutions are required to accurately determine the correction factors. Typically more than eight revolutions are necessary to achieve acceptable accuracy in today's disc drives. An increase in track density requires an increase in the accuracy of the ZAP correction factors. Doubling the track density, for example, requires doubling the accuracy of the ZAP correction factors. The number of averaging revolutions must be four times higher to double the accuracy of the ZAP correction factors. Therefore, the total servo writing time will be eight times higher if track density is doubled because twice as many tracks (requiring four times the revolutions for accurate ZAP correction factors) are present on the disc. Each revolution increases the time and cost of servowriting.

Accordingly there is a need for a method of eliminating propagation of radial errors during self servo track writing that overcomes the limitation of prior art approaches.

SUMMARY OF THE INVENTION

Against this backdrop the present invention has been developed. This invention proposes a method that eliminates the growth of track shape errors during self-propagating servo track writing. The method insures that both the relative track shape error and that the absolute track shape error remains small. In other words, the track-to-track variation and the track variation from a perfect circle remain small. The present invention eliminates relative and absolute track shape errors by writing Zero Acceleration Path ("ZAP") correction factors into the servo sectors during track propagation. The present invention only requires two disc revolutions for each propagation step. Although described herein with reference to a magnetic media data storage device, it is to be understood that the invention may also be applied to other types of data storage devices.

A new ZAP correction method is presented, which is called "recursive estimation". Recursive estimation guarantees that track squeeze is minimized, but it does not guarantee that the tracks are circular. In other words, the recursive estimation method guarantees that the relative track shape error (the track-to track variation) remains small, but recursive estimation does not guarantee that the absolute track shape (the deviation of the tracks from a perfect circle) remains small as self-servo track writing propagates. Therefore, the "recursive estimation" ZAP method is combined with the "inverse transformation" ZAP method in the present invention. A combination of recursive estimation and inverse transformation provides small absolute track shape error and small relative track shape error. Furthermore, a combination of recursive estimation and inverse transformation reduces the number of disc revolutions necessary to determine the ZAP correction factors for each track.

In a preferred embodiment of the present invention, the actuator is placed against one of its travel-limit-stops and a first servo track is written to the disc. Alternatively, the first track (or first several tracks in a servo track guide pattern) can be written on a conventional servowriting machine. ZAP correction factors are determined using inverse transformation and written into the first track, before the self-propagating process starts. Alternatively, if a servowriter is used, ZAP correction factors are determined by inverse transformation and written to the first track or the first several tracks of the servo track guide pattern. Inverse transformation requires several revolutions per track to determine the ZAP correction factors. The amount of time spent determining the ZAP correction factors for the initial tracks, however, is tolerable because inverse transformation is applied only to a small number of tracks. Self-propagating servo writing commences after the ZAP correction factors are determined and written to the initial track or tracks.

The head disc assembly ("HDA") is connected to an electrical control system for self-propagating servo writing. The HDA is the combination of a magnetic media disc (or discs) and an actuator assembly. The control system activates the read element of the actuator assembly and displaces the actuator arm until the read head is aligned over the initial servo track. The control system reads and "follows" the ZAP corrected path of the initial servo track. The control system then activates the write element of the actuator assembly and a new servo track is written onto the disc. ZAP correction factors are determined and written to the servo sectors of the newly written servo track. Next, the control system displaces the actuator arm until the read element is aligned over the new servo track. The control system reads and "follows" the ZAP corrected path of the new servo track. The control system activates the write element and a new servo track is written. Again, ZAP correction factors are determined and written to the servo sectors of the newly written servo track. Again, the control system displaces the actuator arm until the read element is aligned over the new servo track. The process continues until the disc is filled with servo tracks; the write element writing a new servo track as the read element follows the previously written servo tracks.

In accordance with the preferred embodiment of the present invention, the ZAP correction factors for the self-propagated servo tracks are determined by using two disc revolutions per track; a "write revolution" and a "correction revolution". The read element follows track k, the previously written track, and the write element writes servo marks for track k+1 during the write revolution. The position signal is monitored and recorded in order to estimate the shape of track k+1 according to the inverse transformation method during the correction revolution. The preferred embodiment of the present invention does not require extra disc revolutions, and therefore, it does not increase the time required for the self-propagating servo writing process. The present invention, in addition to other benefits, eliminates radial error propagation, takes into account the influence of measurement noise, does not require complicated calculations for implementation, and provides greater absolute track shape accuracy.

These and various other features as well as advantages which characterize the present invention will be apparent from a reading of the following detailed description and a review of the associated drawings.

DETAILED DESCRIPTION

Figure 1:
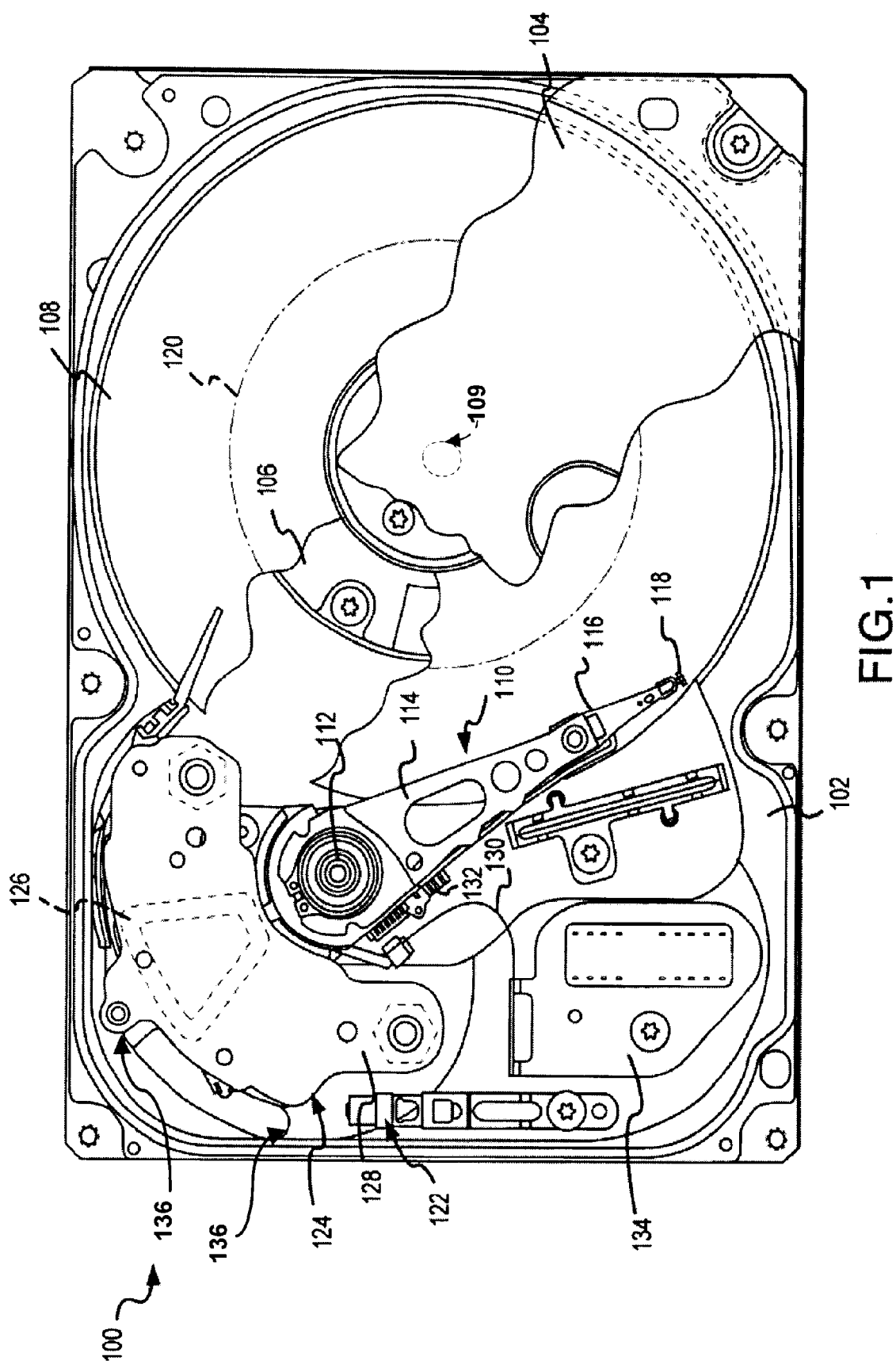
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed about a disc center 109. A magnetic media disc 108 is used to illustrate a preferred embodiment of the present invention, but the invention may be implemented using other types of data storage discs. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118, which includes an air bearing slider enabling the transducer head 118 to fly in close proximity above the corresponding surface of the associated disc 108.

During a seek operation, the track 120 position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the transducer heads 118 are caused to move over the surfaces of the discs 108.

The spindle motor 106 is typically de-energized when the disc drive 100 is not in use for extended periods of time. The transducer heads 118 are moved over park zones near the inner diameter of the discs 108 when the drive motor is de-energized. The transducer heads 118 are secured over the park zones through the use of an actuator latch arrangement 122, which prevents inadvertent rotation of the actuator assembly 110 when the heads 118 are parked.

A flex assembly 130 provides the requisite electrical connection paths for the actuator assembly 110 while allowing pivotal movement of the actuator assembly 110 during operation. The flex assembly 130 includes a preamplifier 132 to which head wires (not shown) are connected; the head wires being routed along the actuator arms 114 and the flexures 116 to the heads 118. The preamplifier 132 amplifies read signals generated by the heads 118 during a read operation. The flex assembly 130 terminates at a flex bracket 134 for communication through the base deck 102 to a disc drive printed circuit board (not shown) mounted to the bottom side of the disc drive 100.

Figure 2:
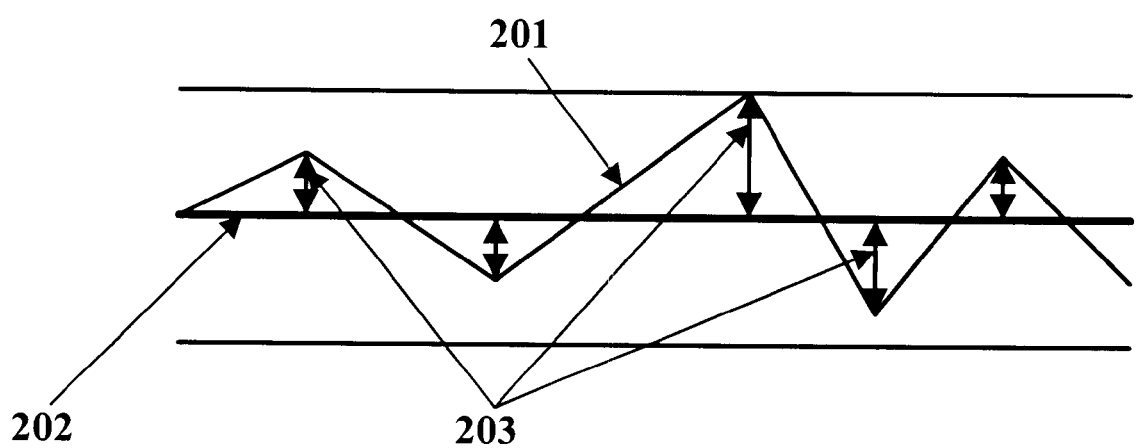
FIG. 2 is illustration of Zero Acceleration Path correction in accordance with a preferred embodiment of the present invention.

FIG. 2 represents a magnified portion a of circular servo track 120 as found on the disc 108 with zero acceleration path ("ZAP") correction factors 203 applied. Radial position, highly magnified, is plotted against circumferential position. Ideally, the servo track 120 is perfectly circular. Due to inaccuracies in the servo track writing process, however, it is difficult to obtain a perfectly circular servo track 120. An original track center 201 represents the servo track's centerline that includes inaccuracies from the servo writing process prior to the application of ZAP correction factors 203.

As seen in FIG. 2, the original track center 201 is not perfectly circular. As a result, any subsequent servo track 120 that is written to the disc 108 using a method of servo track writing that attempts to follow original track center 201, such as self-propagating servo track writing, will contain the same deformation errors as original track center 201. Additionally, the errors in the original track center 201 may, in some circumstances, be magnified during the subsequent writing process.

The basic idea behind ZAP correction is to add appropriate correction factors 203 to the measured head 118 position at each servo sector that cancel all written-in errors. The shape of the resulting modified track 202 will be nearly perfectly circular after the correction factors 203 are added. Any subsequent servo track 120 that is written to the disc 108 using a method of servo track writing, such as self-propagating servo track writing, that attempts to follow the modified track center 202 will not contain the same deformation errors as the original track center 201. Instead, the subsequent servo track 120 will also be nearly perfectly circular. In a preferred embodiment, the correction factors 203 are determined during the servo writing process and stored in a dedicated field in each servo sector. The ZAP correction factors 203 can also be used during the normal disc drive operation to cancel any repeatable disturbances, such as track shape irregularity among others.

Figure 3:
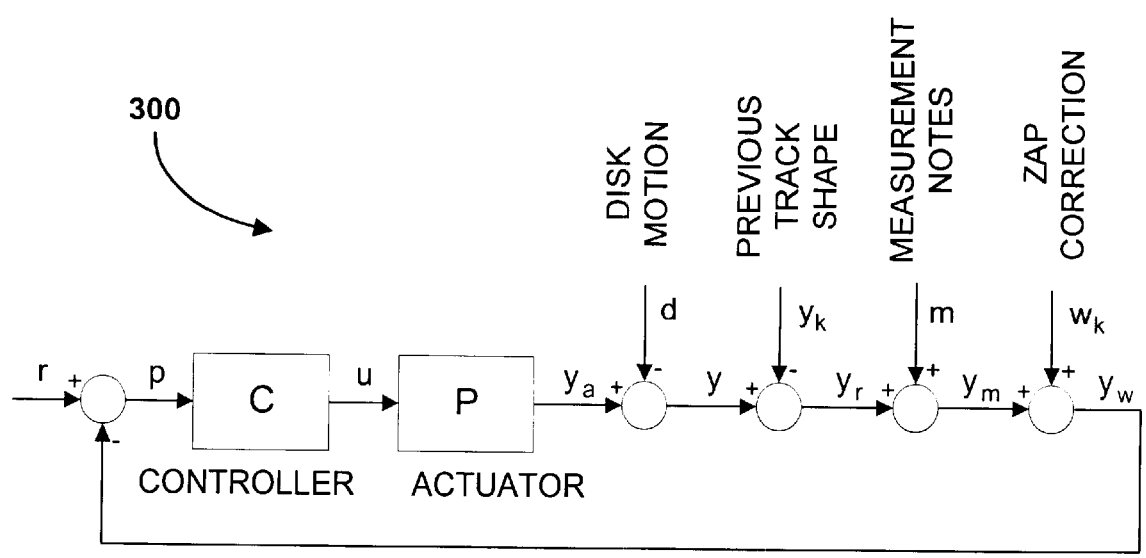
FIG. 3 is a model of a disc drive servo control system with ZAP correction.

FIG. 3 shows the block diagram of the disc drive control system 300 according to a preferred embodiment of the present invention. Note that the sequel subscript k in the various signals denotes a propagation step. In the remainder of this text, the notation $x_k$ will refer to the samples of signal x in the kth propagation step. The description of the present invention assumes that tracks 120 are numbered from 1 to n, and therefore, track 120 written in the kth propagation step will be referred to as track k.

The description of the various signals in FIG. 3 are as follows:

| | |
|---|---|
| r | Set point. |
| p | Position error signal. |
| u | Actuator input signal. |
| $y_a$ | Absolute head 118 position. |
| d | Non-repeatable position disturbance caused by disc 108 motion due to resonance, spindle vibration, etc. Other position disturbances, such as head 118 motion due to wind induced actuator resonance among others, are also included in this signal. |
| y | Head 118 position relative to the disc 108. The shape of the track 120 written in propagation step k is identical to y during the kth propagation step. |
| $y_k$ | Shape of the track 120 followed by the head 118. The value or $y_k$ is equal to the relative position of the head 118 and disc 108 during the kth propagation step. The actuator attempts to follow this track 120 when track k + 1 is being written. |
| $y_r$ | Head 118 position relative to the previous track 120. |
| m | Measurement noise. |
| $y_m$ | Measured head 118 position. |

| | |
|---|---|
| $w_k$ | ZAP correction 203 belonging to the track 120 being followed by the head 118. The value of $w_k$ is equal to the estimated shape of track k. |
| $y_w$ | ZAP corrected measured head position. |

Controller "C" in FIG. 3 represents the disc 100 servo controller for the disc drive 100. The input of the controller is the position error signal p, which is derived by subtracting the corrected measured position $y_w$ from the set point input r. The set point input is used to adjust the desired position of the actuator 110. The output of the controller is signal u, which is fed into the input of the actuator, designated as "P" in FIG. 3. The read and write transducer elements are positioned by the actuator. In a typical disc drive 100 the actuator is a rotary actuator assembly 110 moved by a voice coil motor (VCM) 124.

The output of the actuator block P is the absolute position of the heads 118, which is represented by signal $y_a$. Magnetoresistive read elements are employed in the heads 118 of many disc drives 100. The read and write elements may have significant offset, i.e. the radial position of the read and write elements, relative to the center of the disc 109 surface, may be different. The description of the present invention, for simplicity, assumes that the offset of the read and write elements is zero, i.e. signal $y_a$ represents the position of both elements. However with minor corrections, the methods presented in this invention can be easily applied to situations where the read/write element offset is not zero.

Signal d represents various non-repeatable position disturbances. Typically, non-repeatable disturbances are caused by undesired motion of the disc 108 due to disc resonance, disc flutter, spindle vibration, etc. Disturbances that are repeatable in each revolution (e.g. disc run-out) do not appear in self-propagated servowriting processes, and therefore, are not included in d.

The relative position of the head 118 and the disc 108 is represented by y. The value for y is obtained by summing the absolute head position $y_a$ and the absolute disc position d. Note that in the remainder of this description, it will be assumed that signals representing motion toward the inner diameter (ID) of the disc 108 have positive sign, and signals representing motion toward the outer diameter (OD) of the disc 108 have negative sign. If the disc 108 moves toward the ID, then d changes in the positive direction. However, if the relative position of the disc 108 and head 118 (i.e., signal y) is monitored, it appears as if head 118 moved toward the OD relative to disc 108. In other words, y should decrease, and therefore, the summing junction of $y_a$ and d has a negative sign for d.

The relative position of the disc 108 and actuator assembly 110 cannot be measured directly during the servo writing process. The position measurement is obtained by monitoring the signal generated in the read element by the magnetic marks written in the previous track or tracks 120. Thus, the location of the head 118 is measured relative to the previously written track 120. As a consequence, any irregularities in the shape of the previous track 120 directly influence the position measurement. Signal $Y_r$ represents the relative position of the head 118 and the previous track 120, and it is obtained by subtracting the shape of the previous track 120 from the relative motion of the disc 108 and the head 118.

The position measurement will unfortunately have some inaccuracy due to media noise and electrical noise among others. The measurement error in the position measurement is denoted by the signal m. The sum of the head 118 position relative to the previous track 120, $Y_r$, and the measurement noise, m, gives the actual measured head 118 position, $y_m$.

As previously discussed, irregularities in the shape of the previous track 120 may get amplified in a self-propagating servo writing process. Amplification of irregularities may result in unacceptably large deviation from the ideal perfectly circular track shape within a few hundred propagation steps. The purpose of the ZAP correction signal 203, w, is to correct the imperfections of the track 120 shape and to prevent unacceptable growth of errors.

Ideally, the ZAP correction signal 203 is determined such that $w_k=y_k$. The ZAP correction 203 would then exactly cancel the written in errors of the previous track 120, and the actuator would attempt to follow a perfectly circular path when writing the new track 120. The ZAP correction factors 203 prevent the new track 120 from inheriting the irregularities of the previous track 120 and eliminate the propagation and amplification of written-in errors. The ZAP correction factors 203 are stored on the disc 108 (typically in a dedicated field in each servo sector). The ZAP correction factors 203 are also read and used to correct the measured actuator position during the normal operation of the disc drive 108. The ideal modified track centers 202 will thus be perfectly circular and parallel with each other. The next sections describe different methods used to generate the correction signal $w_k$.

Generating the ZAP Correction Signal Using Recursive Estimation

One approach to determining ZAP correction signals 203 is called "recursive estimation". Recursive estimation is based on determining the shape of the newly written track 120 from the shape of the previous track 120 and the measured head 118 position during the write revolution.

During propagation step k+1, the head 118 is following the track 120 written in the previous propagation step as it writes a new track 120. The shape of the track 120 being written in propagation step k+1 is determined by the relative position of disc 108 and head 118 during the propagation revolution.

Thus, the shape of the track 120 written in propagation step k+1 can be expressed as:

$$y_{k+1}=y_{r(k+1)}+y_k \quad (1)$$

where $y_{r(k+1)}$ denotes the relative position of the head 118 and the previous track 120 during propagation step k+1, and $y_k$ denotes the shape of the track 120 written in the previous propagation step. This equation agrees with the diagram shown in FIG. 3.

It is apparent that if the shape of the previous track 120 is known, then the shape of the new track 120 can be derived from the shape of the previous track 120 and the relative position of the head 118 to the previous track 120 during propagation revolution k+1. Note, however, that this requires the accurate knowledge of $y_{r(k+1)}$ (i.e., the relative position of the head 118 and the previous track 120 during propagation step k+1).

It is clear from examination of FIG. 3 that:

$$y_{w(k+1)}=y_{r(k+1)}+m_{k+1}+w_k \quad (2)$$

where $m_{k+1}$ represents the measurement noise that occurred during propagation step k+1, $y_{r(k+1)}$ represents the position relative to the track k and $y_{w(k+1)}$ represents the ZAP corrected measured position during propagation step k+1. Signal $w_k$ denotes the ZAP correction signal 203 for the track 120 written in the kth propagation step. From Eq. 2, $y_{r(k+1)}$ can be expressed as:

$$y_{r(k+1)} = y_{w(k+1)} - m_{k+1} - w_k \quad (3)$$

Combining Eq. 1 and Eq. 3, it follows that:

$$y_{k+1} = y_k + y_{w(k+1)} - m_{k+1} - w_k \quad (4)$$

The ZAP correction signal $w_k$ can be derived as the estimated shape of track k, i.e.

$$w_k = \hat{y}_k \quad (5)$$

Substituting Eq. 5 into Eq. 4:

$$y_{k+1} = y_k + y_{w(k+1)} - m_{k+1} - \hat{y}_k \quad (6)$$

It is assumed, for purposes of the present example, that the shape of track k has been estimated accurately (i.e. $y_k = \hat{y}_k$). Eq. 6 then simplifies to:

$$y_{k+1} = y_{w(k+1)} m_{k+1} \quad (7)$$

If the measurement noise is small ($m_{k+1} \approx 0$), then Eq. 7 becomes $$y_{k+1} \approx y_{w(k+1)} \quad (8)$$

Thus, the estimated track shape of track k+1 can be calculated as:

$$\hat{y}_{k+1} = y_{w(k+1)} \quad (9)$$

The track shape estimated according to Eq. 9 will be referred to as the "recursive estimate" in the description that follows. The shape of the first track $\hat{y}_1$ can be determined according to the method described in the next section. The shape of each newly written track 120 can then be calculated according to Eq. 9. A significant advantage of this approach is that no extra revolutions are required to determine the shape of the newly written track 120, and therefore, this approach does not influence the servo writing time.

It should be noted, however, that the measurement of the head 118 position relative to the previous track 120 always includes some measurement noise, i.e. $m_{k+1} \neq 0$. From Eq. 7 and 9, it is clear that:

$$\hat{y}_{k+1} = y_{k+1} + m_{k+1} \quad (10)$$

The measurement error will be accumulated in $\hat{y}_{k+1}$ in each propagation step due to the presence of $m_{k+1}$ in Eq. 10. The recursive estimation approach gives good estimation accuracy for a few propagation steps if the measurement noise is reasonably small, however, the error may become unacceptably large after a few hundred propagation steps. The track-to-track variation of the track shape (the relative track shape error) can be kept small with this approach, but the absolute track shape error (the deviation of the track shape from a perfect circle) will increase as the self-servo track writing propagates.

Figure 5:
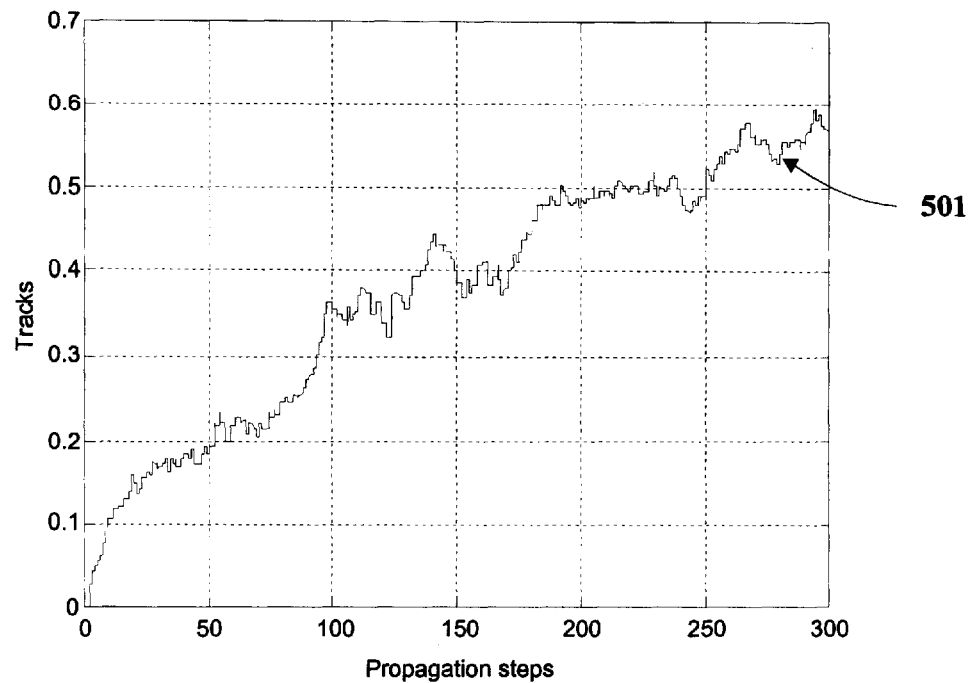
FIG. 5 is a graph of absolute track shape error when ZAP correction is calculated according to recursive estimation.
Figure 6:
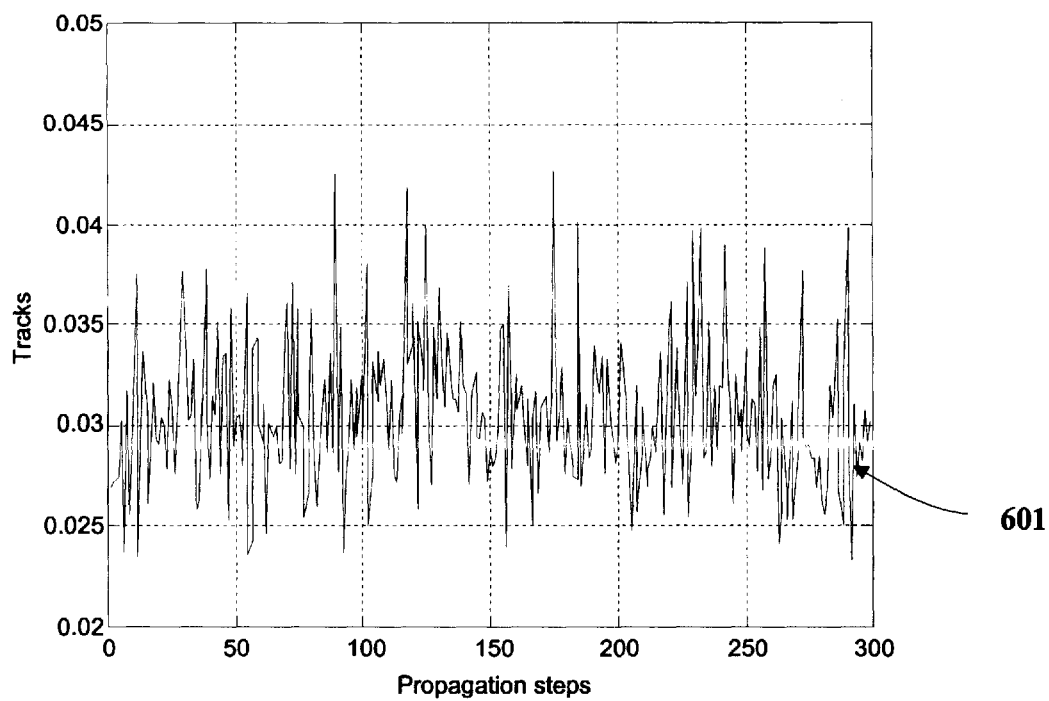
FIG. 6 is a graph of relative track shape error when ZAP correction is calculated according to recursive estimation.

FIG. 5 shows absolute track shape error 501 and FIG. 6 shows relative track shape error 601 when the estimated track shape $\hat{y}_{k+1}$ is computed according to Eq. 9, and the ZAP correction signal is chosen as $w_k = \hat{y}_k$. FIG. 6 illustrates that the relative track shape error 601 remains small as the number of propagation steps increases using the above-described basic recursive estimation method. However, FIG. 5 illustrates that absolute track shape error 501 increases as the number of propagation steps increase using the recursive estimation method. The next section introduces a different method for determining the ZAP correction factors 203 that eliminates the problem of increased absolute track shape error.

Generating the ZAP Correction Signal Using Inverse Transformation

Another approach to determining the ZAP correction signal is called inverse transformation. Inverse transformation is based on reconstructing the disturbance signal from the measured head 118 position. This approach is similar to the ZAP method described by Szita in U.S. application Ser. No. 09/243,574 (1998) or Bi in U.S. application Ser. No. 09/474,277 (1999).

From FIG. 3 it is clear that the ZAP corrected measured position can be expressed as:

$$y_w = \frac{1}{1+PC}(-d - y_k + m + w) \quad (11)$$

The shape of the track 120 being followed by the head 118 (i.e., $y_k$) can then be expressed as:

$$y_k = -y_w(1+PC) + w - d + m \quad (12)$$

The signals w and $y_m$, it should be noted, are immediately available in each revolution.

Assuming that d=0 and m=0, the estimated track shape can be defined as:

$$\hat{y}_k = -y_w(1+PC) + w \quad (13)$$

The track shape estimated according to Eq. 13 will be referred to as the "inverse transformed estimate" in the discussion that follows. Eq. 13 estimates the "raw" track shape (i.e., the track shape without ZAP correction). The path followed by the head 118, however, is the ZAP corrected track shape 202, which can be expressed as $y_k - w$. The estimation of ZAP corrected track shape 202, therefore, can be derived by subtracting the ZAP correction w from Eq. 13:

$$\hat{y}_k - w = -y_w(1+PC) \quad (14)$$

The term $\hat{y}_k - w$ will be referred to as the "ZAP corrected track shape estimate" in the discussion that follows. From Eq. 12 and 13, the estimated raw track shape can be expressed as:

$$\hat{y}_k = y_k + d - m$$

If d and m are small, then $\hat{y}_k \approx y_k$. In most cases, however, the disturbances d and m are not negligible and the accuracy of $\hat{y}_k$ is not satisfactory.

The accuracy of $\hat{y}_k$ can be improved by synchronously averaging $\hat{y}_k$. The signal $\hat{y}_k$ is collected for several disc 108 revolutions in synchronous averaging and the values of $\hat{y}_k$ belonging to the same sectors are averaged. Let $\bar{y}_k$ denote the synchronous average of signal $\hat{y}_k$ over n revolutions:

$$\bar{y}_k = \frac{1}{n}\sum_{i=1}^{n}(\hat{y}_k)_i = \frac{1}{n}\sum_{i=1}^{n}(y_k)_i + \frac{1}{n}\sum_{i=1}^{n}d_i - \frac{1}{n}\sum_{i=1}^{n}m_i \quad (15)$$

The signals d and m in Eq. 12 are non-repeatable, and therefore, their long-term synchronous average is 0:

$$\lim_{n\to\infty} \frac{1}{n}\sum_{i=1}^{n} d_i = 0$$

$$\lim_{n\to\infty} \frac{1}{n}\sum_{i=1}^{n} m_i = 0$$

Thus, if signal $\hat{y}_k$ is averaged for several revolutions, it converges to $y_k$ (i.e., it will approximately be equal to the shape of the track 120 being followed):

$$\lim_{n\to\infty} \frac{1}{n}\sum_{i=1}^{n} (\hat{y}_k)_i = \lim_{n\to\infty} \frac{1}{n}\sum_{i=1}^{n} (y_k)_i = y_k \qquad (16)$$

Clearly, the shape of the track 120 being followed can be determined by reconstructing $\hat{y}_k$ according to Equation 13 and averaging it for several revolutions. Setting the ZAP correction as $w_k=\hat{y}_k$ completely eliminates all written in disturbance and results in a perfectly circular track 120. U.S. Pat. No. 6,101,058 by Morris and Seagate Technology technical memorandum "Computationally Simplified Zero Acceleration Path Methods—Theory and Application" by Q. Bi, K. Gomez, Y. Chen, and K. Ooi describe in more detail the method for determining 1+PC and the method to reconstruct $\hat{y}_k$ in Eq. 13.

Figure 4:
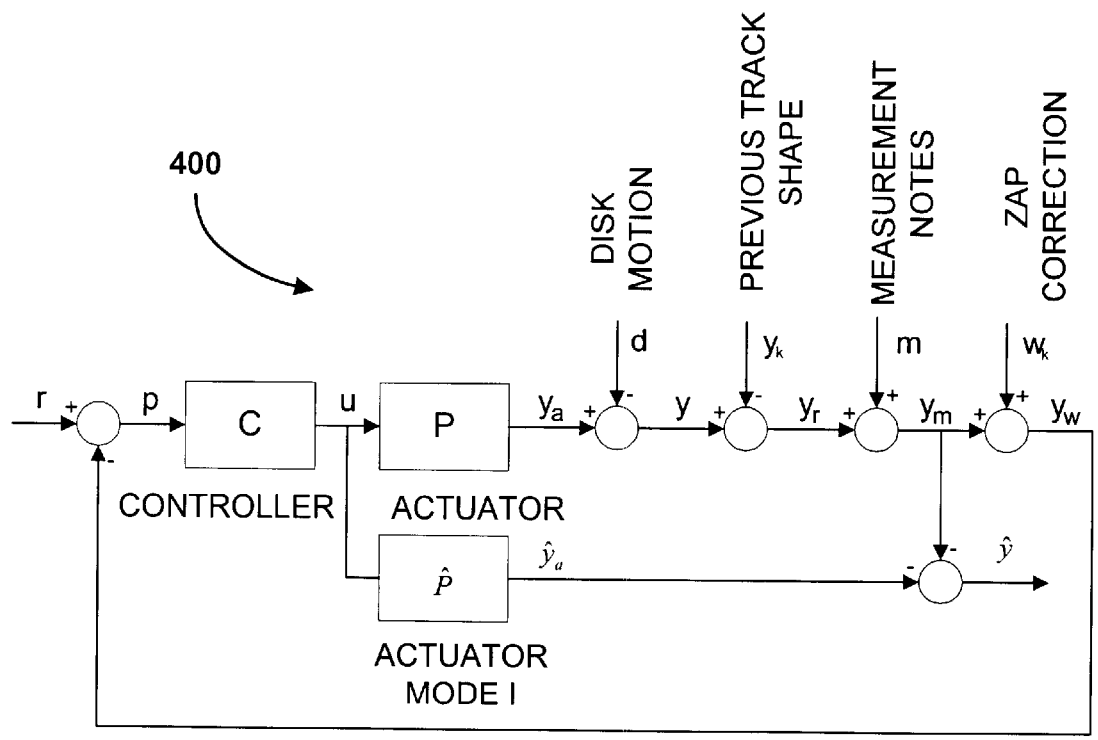
FIG. 4 is an alternative model of a disc drive servo control system for determining the predicted track shape.

Eq. 13 requires an accurate model of the loop return difference 1+PC. In many cases, it is easier to construct a model only for the plant P. In this situation, $\hat{y}_k$ can be determined as shown in FIG. 4. $\hat{P}$ denotes a mathematical model of the plant and $\hat{y}_a$ denotes the estimated absolute actuator position. More information on this approach and a detailed description of how to determine the plant model $\hat{P}$ can be found in the disclosure by Szita, 1998.

The accuracy of determining the track shape depends on how well the influence of non-repeatable disturbances (d and m) has been eliminated by averaging $\hat{y}_k$. Doubling the number of averaging revolutions will result in approximately a 3 dB improvement in the accuracy.

Typically, more than 8 revolutions are necessary to achieve acceptable accuracy in today's disc drives. However as track density of disc drives 100 increase, the accuracy of the ZAP correction 203 has to be increased too. Assuming that the magnitude of disturbances does not decrease significantly, then doubling the track density requires doubling the accuracy of the ZAP correction 203. However, to double the accuracy of ZAP correction 203 the number of averaging revolutions has to be 4 times higher. This means that 4 times more revolutions have to be spent on each track 120 to accurately determine the ZAP correction factors 203. Furthermore, doubling the track density results in twice as many tracks 120 on each disc 108, and therefore, the total servo writing time will be 8 times higher. This cubic relationship between track density and servo writing time makes the practical application of this approach difficult.

Generating the ZAP Correction Signal Using a Preferred Embodiment of the Present Invention The previous two sections presented two different methods to estimate the shape of the tracks 120 during the self-servo track writing process. Inverse transformation guarantees good accuracy, but requires several extra disc 108 revolutions. On the other hand, the time overhead of recursive estimation is minimal, but the long-term accuracy is not acceptable. The present invention combines the accuracy of inverse transformation with the minimal time overhead of recursive estimation to obtain good long-term accuracy without significantly increasing the servo writing time.

Figure 13:
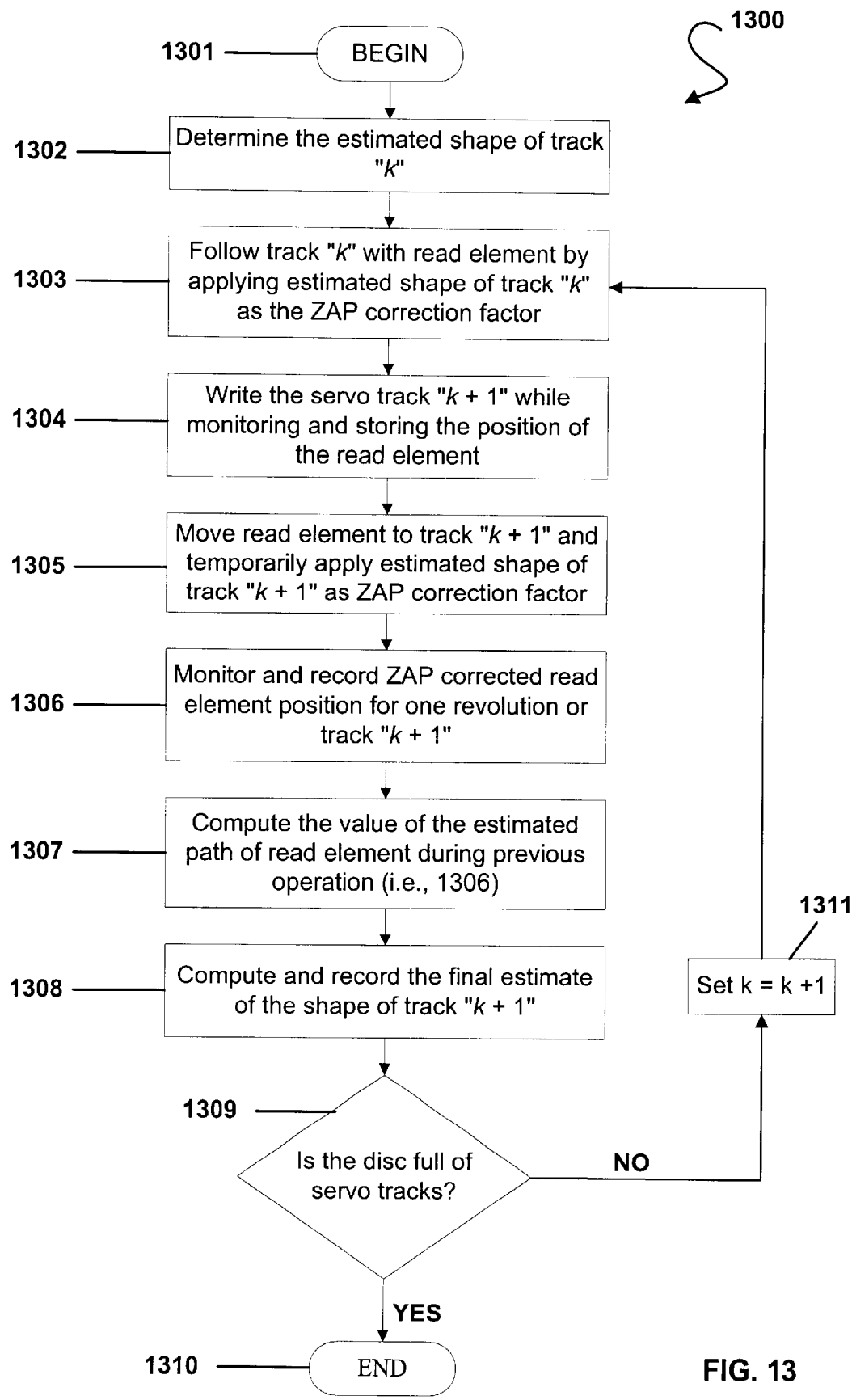
FIG. 13 is an operational flow diagram in accordance with a preferred embodiment of the present invention.

FIG. 13 illustrates operation process 1300 of a preferred embodiment of the present invention. The present invention only requires two revolutions for each propagation step. The propagation process, according to a preferred embodiment of the present invention, starts with "BEGIN" operation 1301. Control is then passed to operation 1302.

Operation 1302 determines the estimated shape of track k. Furthermore, operation 1302 denotes the estimated shape of track k as $\hat{y}_k$. Operation 1302 is completed after k propagation steps have already been completed (i.e., tracks 1 ... k have already been written on the disc). Tracks 1 ... k may be tracks in the servo track guide zone or tracks written by the self-propagating servo writing process. Operational control then passes to operation 1303.

Operation 1303 adjusts the actuator such that the read element follows track k, the track written in a previous propagation step. Operation 1303 applies the estimated shape of track k as the ZAP correction factor 203 (i.e., $w_k=\hat{y}_k$) as the read element follows track k.

As the read element follows track k in operation 1303, operation 1304 assumes control and writes servo bursts for the next track (i.e., for track k+1). The position of the head 118 is monitored and stored by operation 1304 during this revolution. The position of the head 118 is denoted as $\hat{y}_{k+1}'$. It should be noted that $\hat{y}_{k+1}'$ is the estimated shape of track k+1 according to recursive estimation (see Eq. 9). Control then passes to operation 1305.

Operation 1305 moves the read element to the track written in step 1304 (i.e., to track k+1). Operation 1305 temporarily applies the value $\hat{y}_{k+1}'$ as the ZAP correction (i.e., $w_{k+1}=\hat{y}_{k+1}'$) Control then passes to operation 1306.

Operation 1306 monitors, for one revolution, the ZAP corrected position of the head 118 as it travels around track k+1. Operation 1306 then stores the ZAP corrected position of head 118 and as $y_{w(k+1)}$. Operational control then passes to operation 1307.

Operation 1307 computes the value for $\hat{y}_{k+1}''=-=y_{w(k+1)}$ (1+PC). This value is the estimate of the path followed by the read element during the correction revolution (in operation 1306) according to inverse transformation (see. Eq. 14). In other words, this value estimates the leftover non-circularity of track k+1 after it has been corrected by the recursive ZAP factors. Control is then passed to operation 1308.

Operation 1308 obtains the final estimate of the shape of track k+1 by computing the weighted average of the recursive estimation and inverse transformation estimates such that:

$$\hat{y}_{k+1}=a\hat{y}_{k+1}'+(1-a)\hat{y}_{k+1}'' \qquad (17)$$

where a is a possibly frequency dependent weighting factor. It should be noted that $\hat{y}_{k+1}'$ gives an accurate and fast short-term estimation. On the other hand, $\hat{y}_{k+1}''$ gives an accurate long-term estimation, but requires several (typically more than 8) revolutions to achieve satisfactory accuracy. Accordingly, the weight given to $\hat{y}_{k+1}'$ should be significantly higher than the weight given to $\hat{y}_{k+1}''$ in Eq. 17. The choice of a=0.9 ... 0.99 works well in a typical disc drive 100. (A procedure for choosing a, and a stability criterion for a, is discussed below.) Control then passes to determination operation 1309.

Determination operation 1309 sets k=k+1 and ascertains whether disc 108 is filled with servo tracks 120. If disc 108 is filled with servo tracks 120, control branches "YES" and the operation 1310 assumes control. Operation 1310 ends the servowriting process 1300. If disc 108 is not filled with servo tracks 120, control branches "NO" and operational control is transferred to operation 1311. Operation 1311 sets k=k+1. Operational control is then transferred back to operation 1303 and the propagation process repeats.

In accordance with a preferred embodiment of the present invention, servowriting process 1300 requires two revolutions for each propagation step. The head follows track k, and writes the servo marks for track k+1 during the first revolution. During the second revolution, the position signal is monitored and recorded in order to estimate the shape of track k+1 according to inverse transformation. The estimated shape of track k+1 is subsequently computed.

Figure 7:
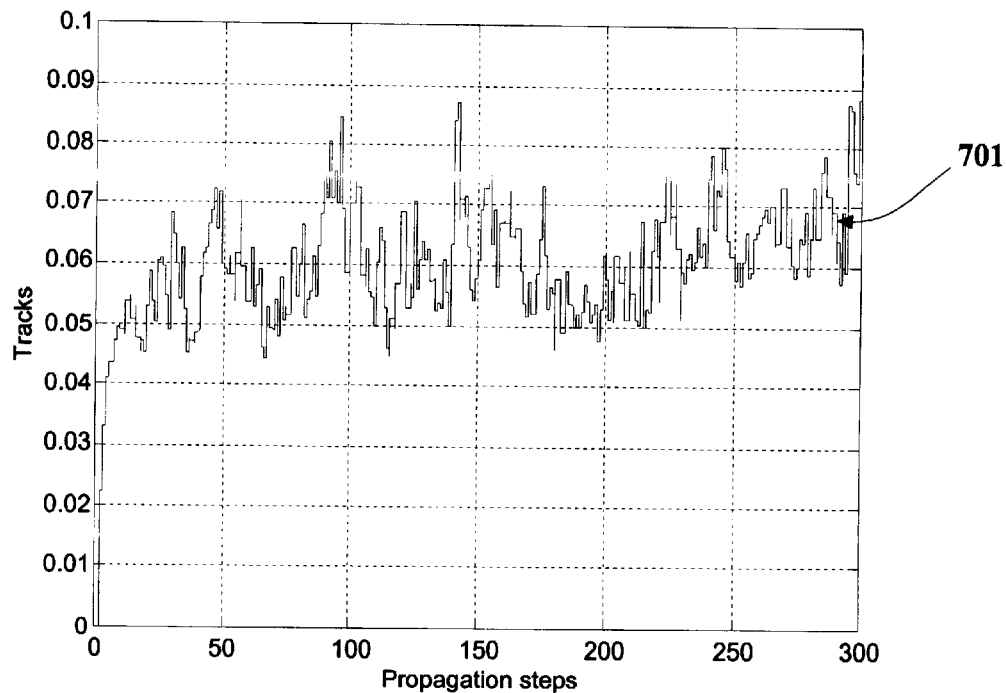
FIG. 7 is a graph of absolute track shape error when ZAP correction is calculated using a preferred embodiment of the present invention.
Figure 8:
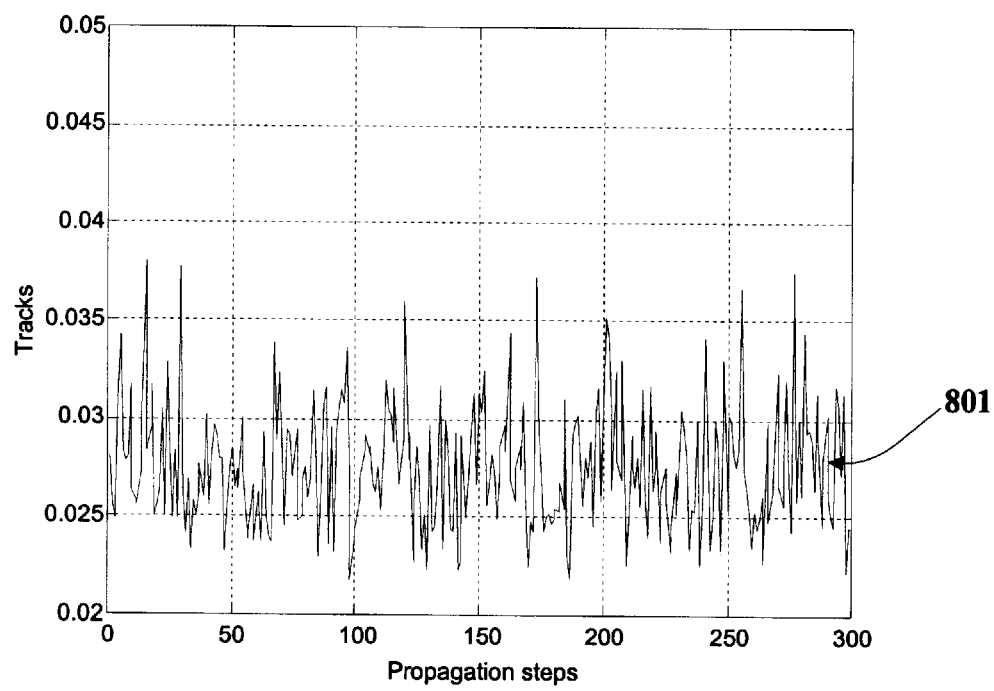
FIG. 8 is a graph of relative track shape error when ZAP correction is calculated using a preferred embodiment of the present invention.

FIG. 7 illustrates that, unlike prior art methods of servowriting, absolute track shape error 701 remains relatively small as servowriting process 1300 progresses. FIG. 8 illustrate that relative track shape error 801 also remains reasonably small as servowriting process 1300 progresses.

Stability of the Propagation Process

In accordance with a preferred embodiment of the present invention, a sufficient condition for the convergence and stability of the propagation process is provided. A guide for choosing an appropriate value for the weighting factor a will also be presented.

According to a preferred embodiment of the present invention, two revolutions are used for each propagation step. The head follows track k, and writes the servo marks for track k+1 during the first revolution. In what follows, the first revolution will be referred to as the "write revolution". During the second revolution, the position signal is monitored and recorded in order to estimate the shape of track k+1 according to inverse transformation method. The second revolution will be referred to as the "correction revolution".

Signal y represents the relative position of the head 118 and disc 108 as illustrated in FIG. 3. The value $y_{k+1}$ denotes the relative position of the head 118 and disc 108 during the write revolution of track k+1. The values $d_{k+1}'$ and $m_{k+1}'$ denote the non-repeatable disturbance and measurement noise, respectively, occurring during the write revolution. The ZAP correction 203 during the write revolution of track k+1 is equal to the estimated shape of track k (i.e., $w_k = \hat{y}_k$). The relative position of the head 118 and disc 108 during the write revolution can then be expressed as:

$$y_{k+1} = -(-y_k + m_{k+1}' + \hat{y}_k)G - d_{k+1}'(1-G) \quad (20)$$

where G denotes the closed loop set point transfer function, or alternatively:

$$G = \frac{PC}{1+PC} \text{ and } 1-G = \frac{1}{1+PC}$$

Defining the estimation error $e_k$ for track k as the difference between the estimated and real track shape, $e_k$ can be written as:

$$e_k = y_k - \hat{y}_k \quad (21)$$

Eq. 20 can then be rewritten as:

$$y_{k+1} = (e_k - m_{k+1}')G - d_{k+1}'(1-G) \quad (22)$$

According to recursive estimation, the shape of track k+1 can be estimated as:

$$\hat{y}_{k+1}' = y_{w(k+1)}' \quad (23)$$

The ZAP corrected measured position during the write revolution of propagation step k+1 can be expressed as (see FIG. 3):

$$y_{w(k+1)}' = (-d_{k+1}' - y_k + m_{k+1}' + \hat{y}_k)(1-G) = (-e_k - d_{k+1}' + m_{k+1}')(1-G) \quad (24)$$

Substituting Eq. 24 into Eq. 23, the estimated track shape according to recursive estimation can be expressed as:

$$\hat{y}_{k+1}' = (-e_k - d_{k+1}' + m_{k+1}')(1-G) \quad (25)$$

Head 118 is following track k+1 during the correction revolution, and $\hat{y}_{k+1}'$ is applied as the ZAP correction (i.e., $w_{k+1} = \hat{y}_{k+1}'$). The ZAP corrected position of head 118 is monitored and stored. Subsequently, the ZAP corrected shape of track k+1 is estimated according to inverse transformation (see Eq. 14):

$$\hat{y}_{k+1}'' = -y_{w(k+1)}''(1+PC) \quad (26)$$

where $y_{w(k+1)}''$ denotes the ZAP corrected measured head position during the correction revolution. The ZAP corrected measured position during the correction revolution of propagation step k+1 can be expressed as:

$$y_{w(k+1)}'' = (-d_{k+1}'' - y_{k+1} + m_{k+1}'' + \hat{y}_{k+1}')\frac{1}{1+PC} \quad (27)$$

where $d_{k+1}''$ and $m_{k+1}''$ denote the non-repeatable disturbance and measurement noise occurring during the correction revolution, respectively. Substituting Eq. 27 into Eq. 26, $\hat{y}_{k+1}''$ can be written as:

$$\hat{y}_{k+1}'' = -(-d_{k+1}'' - y_{k+1} + m_{k+1}'' + \hat{y}_{k+1}') \quad (28)$$

The final estimate of the shape of track k+1 is obtained by computing the weighted average of $\hat{y}_{k+1}'$ and $\hat{y}_{k+1}''$ according to Eq. 17. The estimation error for track k+1 can then be computed according to Eq. 21 (i.e., $e_{k+1} = y_{k+1} - \hat{y}_{k+1}$) Using Equations 17, 20, 24 and 28, $e_{k+1}$ can be expressed as:

$$e_{k+1} = [a - (1-a)(1-G)]e_k - am_{k+1}' + (1-a)[(m_{k+1}' - d_{k+1}')(1-G) + m_{k+1}'' - d_{k+1}''] \quad (30)$$

Note that Eq. 30 is a difference equation of the form:

$$e_{k+1} = be_k + v_{k+1} \quad (31)$$

where $$b = a - (1-a)(1-G) \quad (32)$$

and $$v_{k+1} = -am_{k+1}' + (1-a)[(m_{k+1}' - d_{k+1}')(1-G) + m_{k+1}'' - d_{+1}''] \quad (33)$$

Assuming that v is bounded, the estimation error e will be bounded if and only if |b|<1. In other words, the propagation process is stable if and only if |b|<1. It should be noted that b includes the set-point transfer function G, which is a frequency dependent quantity. The weighting factor a, therefore, must be chosen such that $$|a - (1-a)(1-G(j\omega))| < 1 \quad (34)$$

Figure 9:
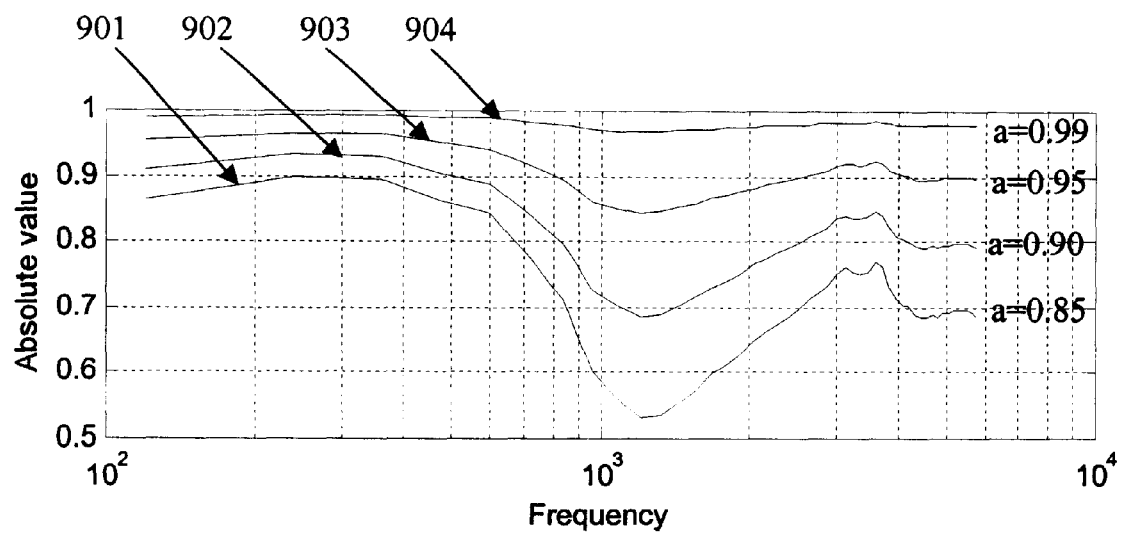
FIG. 9 is a graph of absolute value of "a−(1−a)(1−G(jω))" versus frequency for various values of "a".
Figure 10:
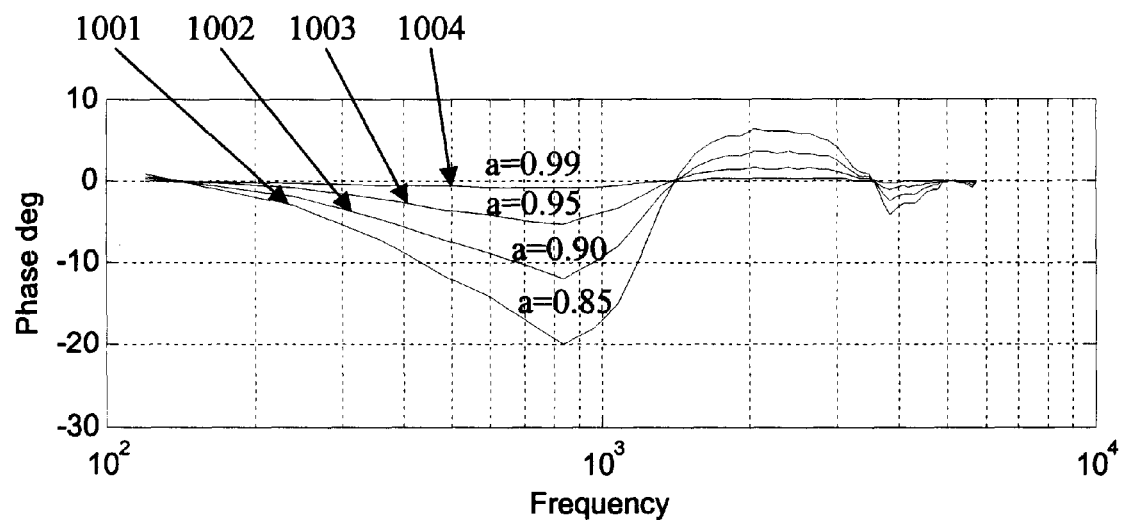
FIG. 10 is a graph of phase degree of "a−(1−a)(1−G(jω))" versus frequency for various values of "a".

In theory, this inequality may require the weighting factor a to be frequency dependent. However in a typical disc drive 100, Eq. 30 holds true when a is a scalar value in the range of 0.5 to 1. FIG. 9 is a graphical representation of the absolute value of $b=|a-(1-a)(1-G(j\omega))|$ as a function of frequency for, various choices of a. For example, curve 901 represents the absolute value of $b=|a-(1-a)(1-G(j\omega))|$ versus frequency where a is set equal to 0.85. FIG. 10 is a graphical representation of the phase degree of $b=|a-(1-a)(1-G(j\omega))|$ as a function of frequency for various values of a. Curve 1001, for example, represents the phase degree of $b=|a-(1-a)(1-G(j\omega))|$ versus frequency where a is set equal to 0.85.

Practical Considerations of Choosing the Weighting Factor a

The difference equation given in Eq. 31 can be considered as a first order discrete low pass filter, where b is the filter pole and $v_{k+1}$ is the input. This filter, however, performs "track-to-track" filtering instead of "sector-to-sector" filtering. In other words, the output is the filtered track-to-track variation of the value of signal v at a particular sector.

Equation 33 shows that signal v has two major contributors. The first component, $-am_{k+1}'$, is the measurement noise that occurred during the write revolution. The second component, $(1-a)[(m_{k+1}'-d_{k+1}')(1-G)+m_{k+1}''-d_{k+1}'']$, contains measurement noise and non-repeatable position disturbance. The measurement noise is significantly smaller than the position disturbance in a typical disc drive. Therefore, $v_{k+1}$ can be approximated as:

$$v_{k+1} \approx -am_{k+1}'+(1-a)[-d_{k+1}'(1-G)-d_{k+1}''] \quad (35)$$

and Eq. 30 can be approximated as $$e_{k+1}=[a-(1-a)(1-G)]e_k-am_{k+1}'+(1-a)[-d_{k+1}'(1-G)-d_{k+1}''] \quad (36)$$

The value of a can be determined at each frequency point to minimize the estimation error if the spectrum of disturbance and measurement noise is known.

EXAMPLE

The closed loop set point transfer function $G \approx 1$ at frequencies below the bandwidth of the servo loop. Eq. 36 can therefore be simplified as $$e_{k+1}=ae_k-am_{k+1}'+(1-a)d_{k+1}'' \quad (36)$$

The measurement noise m is assumed to be a Gaussian noise with a standard deviation of 0.08 (3-sigma=0.024). Furthermore, the disturbance d is approximated to be a Gaussian noise with a standard deviation of 0.1 (3-sigma=0.3).

The magnitude of e gives the absolute track shape error (i.e. the non-circularity of the tracks). The difference $e_{k+1}-e_k$ gives the relative track shape error (i.e. the track squeeze).

Figure 11:
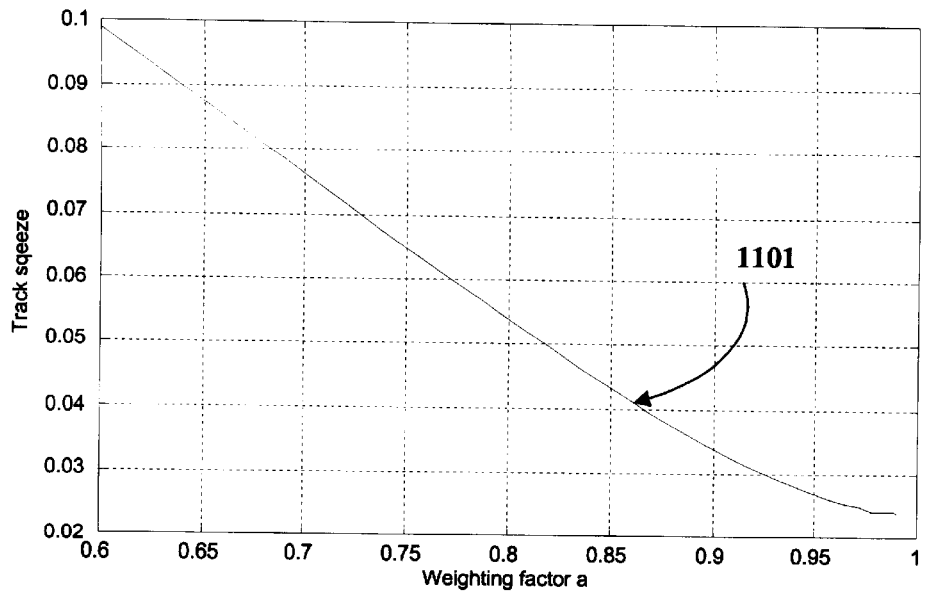
FIG. 11 is a graph of the relative track shape error (DC track squeeze) as a function of the weighting factor "a".
Figure 12:
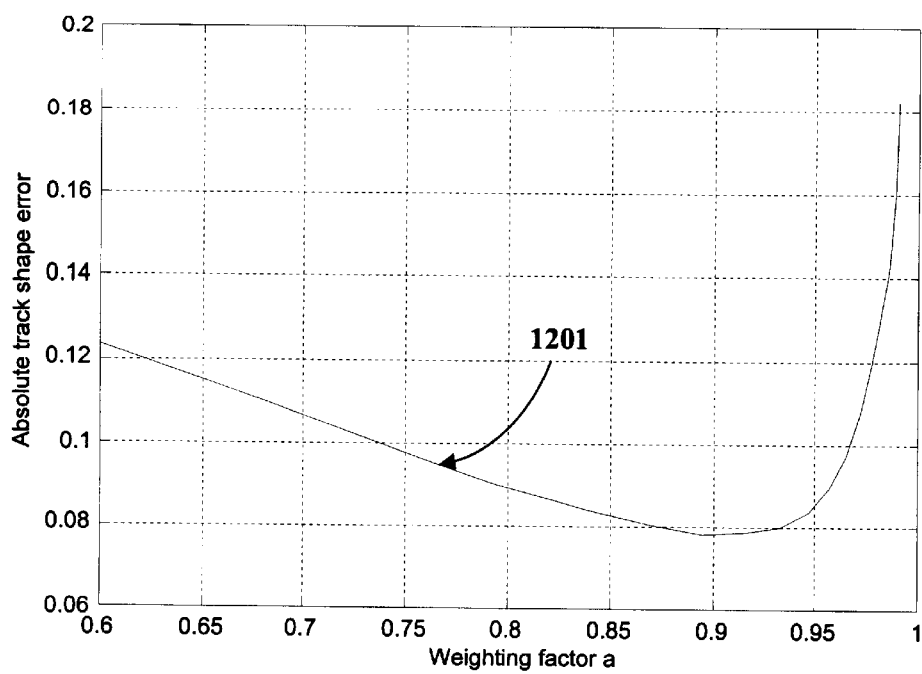
FIG. 12 is a graph of the absolute track shape error (AC track squeeze) as a function of the weighting factor "a".

FIG. 11 illustrates track squeeze versus weighing factor a. Curve 1101 represents the relative track shape error as a function of a. FIG. 12, on the other hand, illustrates absolute track squeeze versus weighing factor a. Curve 1201 represents the absolute track shape error as function of a. The goal is to select the weighting factor, a, such that both relative track shape error 1101 and absolute track shape error 1201 are reasonably small. The absolute track shape error 1201 is less critical than the relative track shape error 1101 in a typical disc drive 100.

The choice of a=0.95, for example, results in an absolute track shape error of 0.85 and a relative track shape error of 0.027. The choice of a=0.95 is acceptable in a typical disc drive 100.

In summary, the present invention can be viewed as a method (such as shown in operational flow process 1300) of writing servo tracks (such as 120) to a data storage disc (such as 108) in a data storage device (such as 100). The data storage device (such as 100) having an actuator arm (such as 114) located adjacent to the disc (such as 108) that traverses a surface of the disc (such as 108), the actuator arm (such as 114) having a travel-limit-stop (such as 136), a transducer head (such as 118) attached to the actuator arm (such as 114), the transducer head (such as 118) having a read element and a write element.

The method of the present invention can be view as comprising the steps of: writing a servo track k (such as 120) on the disc (such as 108); reading the servo track k (such as 120) with the read element; determining an estimated track shape of the servo track k (such as 120); and writing the estimated shape of the servo track k (such as 120) as a zero acceleration path ("ZAP") correction factor (such as 203) within the servo track k (such as 120).

The method (such as shown in operational flow process 1300) includes following the servo track k (such as 120) corrected by the ZAP correction factor for track k with the read element; writing a servo track k+1 (such as 120) with the write element while simultaneously monitoring and recording a position of the read element relative to the surface of the disc (such as 108); and computing an estimated shape of the servo track k+1 (such as 120) from the position of the read element obtained in the preceding step. Additionally, the preceding three steps can be viewed as occurring in one revolution of the disc (such as 108).

The method (such as shown in operational flow process 1300) includes aligning the read element over the servo track k+1 (such as 120); applying the estimated shape of the servo track k+1 (such as 120) as a ZAP correction factor (such as 203) for the servo track k+1; following servo track k+1 (such as 120) corrected by the ZAP correction factor for track k+1 with the read element; monitoring,a ZAP corrected (such as 203) read element position over the servo track k+1 (such as 120) for one revolution of the disc (such as 108); recording the ZAP corrected (such as 203) read element position obtained from the preceding monitoring step; computing an estimated path of the read element over the servo track k+1 (such as 120); computing a final estimated shape of the servo track k+1 (such as 120); and, writing the final estimated shape of the servo track k+1 (such as 120) within the servo track k+1 (such as 120) with the write element. Additionally, the preceding steps, from aligning the read element over track k+1 (such as 120) to computing a final estimated shape of the servo track k+1 (such as 120) can be viewed as occurring in one revolution of the disc (such as 108).

Additionally, the method (such as shown operational flow process 1300) can also be viewed as writing the servo track k (such as 120) when the actuator arm (such as 114) is positioned at the travel-limit-stop (such as 136). Inverse transformation can be used to determining the estimated track shape of servo track k (such as 120). Inverse transformation can also be used to determine the value for the estimated path of the read element. Recursive estimation can be used to compute the estimated shape of servo track k+1 (such as 120).

Furthermore, a weighted average of the estimated track shape of servo track k+1 (such as 120) found by recursive estimation and the estimated path of the read element found by inverse transformation can be used to compute the final estimate of the shape of servo track k+1 (such as 120). The weighed average can be found by using the equation $\hat{y}_{k+1}=a\hat{y}_{k+1}'+(1-a)\hat{y}_{k+1}''$, where $\hat{y}_{k+1}'$ represents the estimated shape of track k+1 (such as 120) found by recursive estimation, $\hat{y}_{k+1}''$ represents the estimated path of the read element over track k+1 (such as 120) found by inverse transformation, and where a represents a weighing factor. The value of a (such as 901) for the weighted average calculation is chosen such that the estimated track shape of track k+1 (such as 120) found by recursive estimation (i.e., $\hat{y}_{k+1}'$) is given greater weight than the estimated path of the read element over track k+1 (such as 120) found by inverse transformation (i.e., $\hat{y}_{k+1}''$). The value of a (such as 901) can also be chosen such that $|a-(1-a)(1-G(j\omega))|<1$, where G is a frequency dependent set-point transfer function. The method (such as shown in operational flow process 1300) can be used to fill a disc (such as 108) with servo tracks (such as 120) by setting k=k+1 and repeating the process from the step of following the estimated shape of track k to the step of writing the final estimated value of the shape of track k+1.

The present invention can be further viewed as an apparatus for writing a servo track (such as 120) to a data storage disc (such as 108) in a data storage device (such as 100). The data storage device (such as 100) can be viewed as having an actuator arm (such as 114) located adjacent to the disc (such as 108) that traverses the surface of the disc (such as 108). The actuator arm (such as 114) can be viewed as having a travel-limit-stop (such as 136). A read/write head is attached to the actuator arm (such as 114); the read/write head having a read element and a write element. The apparatus has a servo controller for positioning the read/write head relative to the surface of the disc(such as 108).

The apparatus also has a controller operable to direct the read element to retrieve information from the disc (such as 108), direct the write element to store information to the disc (such as 108), determine an estimated shape of a servo track k (such as 120) located on the disc (such as 108), determine an estimated shape of a servo track k+1 (such as 120) located on the (such as 108) disc, determine a track shape correction factor (such as 203), write the track shape correction factor (such as 203) to the disc (such as 108), compute an estimated path of the read element, compute a final estimated shape of the servo track k+1 (such as 120).

The apparatus servo controller can accept a set-point signal, a position error signal, and a zero acceleration path (such as 203) corrected measured head signal. The controller can be viewed as using: recursive estimation, inverse transformation, or a combination of recursive estimation and inverse transformation to determine the estimated shape of the servo track k (such as 120) and to determine the estimated shape of the servo track k+1 (such as 120).

Furthermore, the apparatus can be viewed as having servo track k (such as 120) located on the disc (such as 108) surface such that the read element is aligned over the servo track k (such as 120) when the actuator arm (such as 114) is located at the travel-limit-stop (such as 136). Finally, the data storage disc (such as 108) of the apparatus can be viewed as a magnetic media disc (such as 108).

Numerous other changes may be made which will readily suggest themselves to those skilled in the art and which are encompassed in the spirit of the invention disclosed and as defined in the appended claims.

What is claimed is:

1. A method for writing a servo track to a data storage disc in a data storage device, the data storage device having an actuator arm located adjacent to the disc that traverses a surface of the disc, a transducer head attached to the actuator arm, the transducer head having a read element and a write element, the method comprising steps of:
   a) writing a servo track k on the disc;
   b) reading the servo track k with the read element;
   c) determining an estimated track shape of the servo track k;
   d) writing the estimated shape of the servo track k as a zero acceleration path ("ZAP") correction factor within the servo track k;
   e) following servo track k corrected by the ZAP correction factor for track k with the read element;
   f) writing a servo track k+1 with the write element while simultaneously monitoring and recording a position of the read element relative to the surface of the disc;
   g) computing an estimated shape of the servo track k+1 from the position of the read element obtained in writing step (f);
   h) aligning the read element over the servo track k+1;
   i) applying the estimated shape of the servo track k+1 as a ZAP correction factor for the servo track k+1;
   j) following servo track k+1 corrected by the ZAP correction factor for track k+1 with the read element; and,
   k) monitoring a ZAP corrected read element position over the servo track k+1.

2. The method of claim 1, further comprising steps:
   l) recording the ZAP corrected read element position obtained from monitoring step (k);
   m) computing an estimated path of the read element over the servo track k+1;
   n) computing a final estimated shape of the servo track k+1; and,
   o) writing the final estimated shape of the servo track k+1 within the servo track k+1 with the write element.

3. The method of claim 2, wherein applying step (i) through computing step (n) are completed during a single revolution of the data storage disc.

4. The method of claim 2 wherein computing step (m) further comprises using an inverse transformation method to determine the value for the estimated path of the read element.

5. The method of claim 2 wherein computing step (n) further comprises, using the weighted average of the estimated track shape of servo track k+1, found by a recursive estimation method in computing step (g), and the estimated path of the read element, found by an inverse transformation method in computing step (m), to compute the final estimate of the shape of servo track k+1.

6. The method of claim 5 wherein the weighed average of computing step (n) further comprises using an equation $\hat{y}_{k+1}=a\hat{y}'_{k+1}+(1-a)\hat{y}''_{k+1}$, having $\hat{y}'_k+$representing the estimated shape of track k+1 found by the recursive estimation method in computing step (g), $\hat{y}''_{k+1}$representing the estimated path of the read element over track k+1 found by the inverse transformation method in computing step (m), and a representing a weighing factor.

7. The method of claim 6 further comprising, choosing a value for the a the weighing factor such that, for the weighted average calculation of computing step (n), the estimated track shape of track k+1 found by the recursive estimation method (i.e., $\hat{y}'_{k+1}$) in computing step (g) is given greater weight than the estimated path of the read element over k+1 found by the inverse transformation method (i.e., $\hat{y}''_{k+1}$) in computing step (m).

8. The method of claim 6 further comprising choosing the a weighing factor such that $|a-(1-a)(1-G(j\omega))|<1$, where G is a frequency dependent set-point transfer function.

9. The method of claim 2 further comprising steps:
   p) setting k=k+1; and
   q) repeating following step (e) through writing step (o) until a desired track density is reached on the data storage disc.

10. The method of claim 1 further comprising, positioning the actuator arm at a travel-limit-stop and writing the servo track k.

11. The method of claim 1 wherein determining step (c) further comprises, using an inverse transformation method to determine the estimated track shape of servo track k.

12. The method of claim 1, wherein following step (e) through computing step (g) are a completed during a single revolution of the data storage disc.

13. The method of claim 1 wherein computing step (g) further comprises, using a recursive estimation method to determine the estimated shape of servo track k+1.

14. An apparatus for writing a servo track to a data storage disc in a data storage device, the data storage device having an actuator arm located adjacent to the disc that traverses a surface of the disc, the actuator arm having a travel-limit-stop, a read/write head attached to the actuator arm, the read/write head having a read element and a write element, and a servo controller for positioning the read/write head relative to the surface of the disc, the apparatus comprising:

a controller operable to direct the read element to retrieve information from the disc, direct the write element to store information to the disc, determine an estimated shape of a servo track k located on the disc, determine an estimated shape of a servo track k+1 located on the disc, determine one or more track shape correction factors for each track, write the track shape correction factors to one or more servo sectors of each track, compute an estimated path of the read element over servo track k+1, and compute a final estimated shape of the servo track k+1 based on a weighted average of the estimated shape of servo track k+1 and the estimated path of the read element over servo track k+1.

15. The apparatus of claim 14, wherein the servo controller for positioning the read/write head accepts a set-point signal, a position error signal, and a zero acceleration path corrected measured head signal.

16. The apparatus of claim 14, wherein the controller uses a recursive estimation method to determine the estimated shape of the servo track k and the estimated shape of the servo track k+1.

17. The apparatus of claim 14, wherein the controller uses an inverse transformation method to determine the estimated shape of the servo track k and the estimated shape of the servo track k+1.

18. The apparatus of claim 14, wherein the controller uses a combination of a recursive estimation method and an inverse transformation method to determine the estimated shape of the servo track k and to determine the estimated shape of the servo track k+1.

19. The apparatus of claim 14, wherein the servo track k is located on the disc surface so that the read element is aligned over the servo track k when the actuator arm is located at the travel-limit-stop.

* * * * *

UNITED STATES PATENT AND TRADEMARK OFFICE
CERTIFICATE OF CORRECTION

PATENT NO. : 6,608,731 B2
DATED : August 19, 2003
INVENTOR(S) : Szita

It is certified that error appears in the above-identified patent and that said Letters Patent is hereby corrected as shown below:

Column 2,
Line 13, delete "enable;signal" and replace with -- enable signal --

Column 4,
Line 33, delete "Yarrnchuk" and replace with -- Yarmchuk --
Line 35, delete "Yamichuk" and replace with -- Yarmchuk --

Column 11,
Line 23, replace "$y_{k+1}=y_{w(k+1)}m_{k+1}$" and replace with -- $y_{k+1}=y_{w(k+1)} - m_{k+1}$ --

Column 20,
Line 46, replace "$y'_{k+}$representing" with -- $\hat{y}'_{k+1}$ representing --

Column 21,
Line 8, delete "a"

Column 22,
Lines 19-22, delete "a combination of a recursive estimation method and an inverse transformation method to determine the estimated shape of the servo track k and to determine the estimated shaped" and insert -- an inverse transformation method to compute the estimated path of the read element over servo track $k$+1 and to determine the estimated shaped of the servo track $k$, and a recursive estimation method to determine the estimated shape --

Signed and Sealed this

Seventeenth Day of February, 2004

JON W. DUDAS
*Acting Director of the United States Patent and Trademark Office*